(12) United States Patent
Bailiang (10) Patent No.: US 9,684,425 B2
(45) Date of Patent: Jun. 20, 2017

(54) SUGGESTING A TARGET LOCATION UPON VIEWPORT MOVEMENT

(71) Applicant: GOOGLE INC., Mountain View, CA (US)

(72) Inventor: Zhou Bailiang, Balgowlah (AU)

(73) Assignee: GOOGLE INC., Mountain View, CA (US)

( * ) Notice: Subject to any disclaimer, the term of this patent is extended or adjusted under 35 U.S.C. 154(b) by 298 days.

(21) Appl. No.: 14/462,307

(22) Filed: Aug. 18, 2014

(65) Prior Publication Data

US 2016/0048282 A1     Feb. 18, 2016

(51) Int. Cl.
| | |
|---|---|
| G01C 21/36 | (2006.01) |
| G09B 29/10 | (2006.01) |
| G09B 29/00 | (2006.01) |
| G06F 3/0481 | (2013.01) |

(52) U.S. Cl.
CPC ......... *G06F 3/0481* (2013.01); *G01C 21/367* (2013.01); *G09B 29/005* (2013.01); *G09B 29/106* (2013.01)

(58) Field of Classification Search
CPC .. G06F 3/0485; G06F 3/0481; G06F 3/04842; G01C 21/00–21/3697; G09B 29/00–29/14; G09B 29/106–29/108
See application file for complete search history.

(56) References Cited

U.S. PATENT DOCUMENTS

| | | |
|---|---|---|
| 6,178,380 B1 | 1/2001 | Millington |
| 7,359,798 B2 | 4/2008 | Nagamasa |
| 7,734,807 B2 | 6/2010 | Shuster |
| 7,839,926 B1 | 11/2010 | Metzger et al. |
| 7,986,319 B2 | 7/2011 | Dommisse et al. |
| 8,014,943 B2 * | 9/2011 | Jakobson ........... G01C 21/3682 340/995.21 |
| 8,032,297 B2 | 10/2011 | Jakobson |
| 8,060,582 B2 | 11/2011 | Bliss et al. |
| 8,274,524 B1 | 9/2012 | Cornell et al. |

(Continued)

FOREIGN PATENT DOCUMENTS

EP     1 090273 B1     11/2012

OTHER PUBLICATIONS

Baudisch et al., "Halo: A Technique for Visualizing Off-Screen Locations," Paper/Demos: Interaction Techniques for Constrained Displays (2003).

(Continued)

*Primary Examiner* — Jennifer To
*Assistant Examiner* — Liang Li
(74) *Attorney, Agent, or Firm* — Marshall, Gerstein & Borun LLP (57) ABSTRACT

A digital map of a geographic area is provided via a user interface within a viewport, which defines a viewable portion of the digital map. The viewport is repositioned relative to the digital map in accordance with user commands provided via the user interface. A substantially continuous movement of the viewport in response to a plurality of similar user commands is detected. In response, a geographic place located in a general direction of the continuous movement of the viewport is determined, and a control for directly positioning the viewport over a portion of the digital map representing the geographic place is provided.

17 Claims, 4 Drawing Sheets

(56) References Cited

U.S. PATENT DOCUMENTS

| | | |
|---|---|---|
| 8,350,849 B1 | 1/2013 | Jones et al. |
| 8,433,512 B1* | 4/2013 | Lopatenko ............ G01C 21/20 |
| | | 701/400 |
| 8,479,105 B2 | 7/2013 | Gamaley et al. |
| 8,538,956 B1 | 9/2013 | Szabadka et al. |
| 8,589,818 B1 | 11/2013 | Jones et al. |
| 8,626,637 B1 | 1/2014 | Gooch et al. |
| 8,671,106 B1 | 3/2014 | Lee et al. |
| 2005/0177305 A1 | 8/2005 | Han |
| 2007/0050129 A1 | 3/2007 | Salmre |
| 2007/0233385 A1 | 10/2007 | Dicke et al. |
| 2007/0242084 A1 | 10/2007 | Bowman et al. |
| 2008/0228386 A1 | 9/2008 | Geelen et al. |
| 2009/0055087 A1* | 2/2009 | Beacher ................. G01C 21/36 |
| | | 701/532 |
| 2009/0281719 A1 | 11/2009 | Jakobson |
| 2010/0031186 A1 | 2/2010 | Tseng et al. |
| 2010/0115459 A1* | 5/2010 | Kinnunen ............. G01C 21/20 |
| | | 715/785 |
| 2011/0016412 A1 | 1/2011 | Grosz et al. |
| 2012/0023446 A1 | 1/2012 | Minde |
| 2012/0032974 A1 | 2/2012 | Lynch |
| 2012/0110356 A1 | 5/2012 | Yousefi et al. |
| 2012/0278512 A1 | 11/2012 | Alatorre et al. |
| 2012/0290950 A1 | 11/2012 | Rapaport et al. |
| 2013/0093750 A1 | 4/2013 | Cornell et al. |
| 2013/0147713 A1* | 6/2013 | Klassen ............. G01C 21/3682 |
| | | 345/167 |
| 2013/0166191 A1* | 6/2013 | Gabara ................ G01C 21/367 |
| | | 701/409 |
| 2013/0198281 A1 | 8/2013 | Scuba et al. |
| 2013/0257742 A1* | 10/2013 | Jones ....................... G09G 5/34 |
| | | 345/173 |
| 2013/0326384 A1* | 12/2013 | Moore ............... G01C 21/3638 |
| | | 715/771 |
| 2014/0059060 A1* | 2/2014 | Yang ................. G06F 17/30241 |
| | | 707/754 |
| 2014/0114574 A1* | 4/2014 | Tertoolen ............. G01C 21/367 |
| | | 701/533 |
| 2014/0340304 A1* | 11/2014 | Dewan .................... G06T 13/80 |
| | | 345/156 |
| 2014/0365111 A1* | 12/2014 | McClernon ........... G01C 21/20 |
| | | 701/409 |

OTHER PUBLICATIONS

Gustafson et al., "Wedge: Clutter-Free Visualization of Off-Screen Locations," CHI 2008 Proceedings—Displayful and Displayless (2008).

U.S. Appl. No. 13/586,694, "Out-of-Viewpoint Indicators for Relevant Map Features," filed Aug. 15, 2012.

U.S. Appl. No. 13/733,402, "Moveable Viewpoint for Indicating Off-Screen Content," filed Jan. 3, 2013.

International Search Report and Written Opinion for Application No. PCT/US2015/045487, dated Nov. 12, 2015.

* cited by examiner

SUGGESTING A TARGET LOCATION UPON VIEWPORT MOVEMENT

FIELD OF TECHNOLOGY

This disclosure relates to interactive geographic applications and, more particularly, to providing interactive controls for positioning the window delimiting the viewable portion of the map over the desired location.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A variety of computing devices support geographic software for displaying interactive digital maps of geographic areas. The geographic software typically provides directional, rotational, and zoom controls for positioning a window defining a viewable portion of the digital map, which can be referred as to as "viewport," over the desired location. For example, these controls can be provided in the form of buttons overlaying the digital map. As another example, geographic software operating in a device equipped with a touchscreen can support user gestures, so that the user can pan across the digital map by swiping her finger in the desired direction, zoom in on an area by pinching two fingers together, zoom out on an area by spreading two fingers apart, etc.

SUMMARY

A geographic application of this disclosure detects continuous movement of a viewport in a certain direction and automatically generates a control for directly repositioning the viewport over a geographic place on the trajectory the viewport appears to follow. The geographic place can be relatively remote, and thus the control allows the user to quickly "jump" to a new geographic area rather than repeatedly pan the viewport, for example, or submit the name of the geographic place. In an example implementation, the geographic application provides the interactive control in the form of a selectable link to the geographic place appearing in a window that overlays the digital map. In some cases, the geographic application can provide links to several geographic place, each of which is on the trajectory of the viewport.

More specifically, one embodiment of these techniques is a method for providing interactive user controls in a geographic application. The method can be executed on one or more processors. The method includes providing, via a user interface, a digital map of a geographic area within a viewport, where the viewport defines a viewable portion of the digital map. The method also includes repositioning the viewport relative to the digital map in accordance with user commands provided via the user interface, detecting a substantially continuous movement of the viewport in response to a plurality of similar user commands, determining a geographic place located in a general direction of the continuous movement of the viewport, and providing, by the one or more processors via the user interface, a control for directly positioning the viewport over a portion of the digital map representing the geographic place.

In another embodiment, a computing device includes a user interface configured to display content and receive user input, one or more processors coupled to the user interface; and a non-transitory computer-readable medium storing instructions. When executed on the one or more processors, the instructions cause the computing device to provide, via the user interface, a digital map of a geographic area within a viewport defining a viewable portion of the digital map, reposition the viewport relative to the digital map in accordance with user commands provided via the user interface, detect a substantially continuous movement of the viewport in response to a plurality of similar user commands, determine a geographic place located in a general direction of the continuous movement of the viewport, and provide, via the user interface, a control for directly positioning the viewport over a portion of the digital map representing the geographic place.

In yet another embodiment, a method in a network server includes receiving, from a user device, indications of at least (i) a current position of a viewport defining a viewable portion of a digital map, (ii) a zoom level of the viewport, and (iii) a direction in which the viewport is travelling from the current position. The method further includes determining several candidate geographic places on a trajectory consistent with the direction in which the viewport is travelling, selecting a geographic place from the several candidate geographic places based at least on the indicated zoom level, and sending an indication of the geographic place to the user device for generating a control to directly position the viewport over a portion of the digital map representing the geographic place.

DETAILED DESCRIPTION OF THE DRAWINGS

Overview

A geographic application detects continuous movement of a window within which a digital map is being displayed ("map viewport"), identifies a geographic place that will become visible within the viewport if the viewport continues to move along its current trajectory, and provides a user control for directly placing the viewport over the geographic place. Thus, the viewport can quickly "jump" over to a new location upon user confirmation. Depending on the implementation and/or scenario, the geographic application can identify and suggest a single target or multiple targets to which the viewport can jump.

In an example scenario, the user is viewing a map of Los Angeles, Calif. on a touchscreen device such as a smartphone. The zoom level is such that most of the city fits on the screen. The user then swipes the map to move the viewport in the generally northwestern direction. The viewport may advance to become centered approximately over Santa Clarita. The user swipes again, and the viewport is now centered approximately over the eastern portion of the Los Padres National Forest. After another swipe, the viewport is centered approximately over the Bitter Creek National Wildlife Refuge. The geographic application can detect three consecutive swipes in a similar direction defining a substantially continuous movement of the viewport, determine the likely trajectory viewport will follow should the user continue to swipe in this direction, determine that the trajectory passes through San Francisco, Calif., and provide a window overlaying the digital map that includes a link to San Francisco, Calif. If the user clicks on the link, the geographic application positions the viewport directly over San Francisco.

More generally, the geographic application can determine whether the viewport is moving in a substantially continuous manner by detecting a certain number of consecutive swipes in a similar direction, a certain number of consecutive mouse clicks, a certain number of consecutive voice commands, etc. Further, in a gesture-based environment, the geographic application can identify substantially continuous motion of the viewport in response to a smaller consecutive number of swipes when the acceleration the user communicates to the viewport with the swipe gesture exceeds a certain threshold.

The geographic application can identify one or more targets in view of the zoom level as well as the direction in which the viewport currently is moving. For example, the geographic application can identify a more remote target if the viewport is at a relatively low zoom level (and therefore covering a relatively large geographic area), and a less remote target if the viewport is at a relatively high zoom level (and therefore covering a relatively small geographic area).

Example User Device and Communication System

Figure 1:
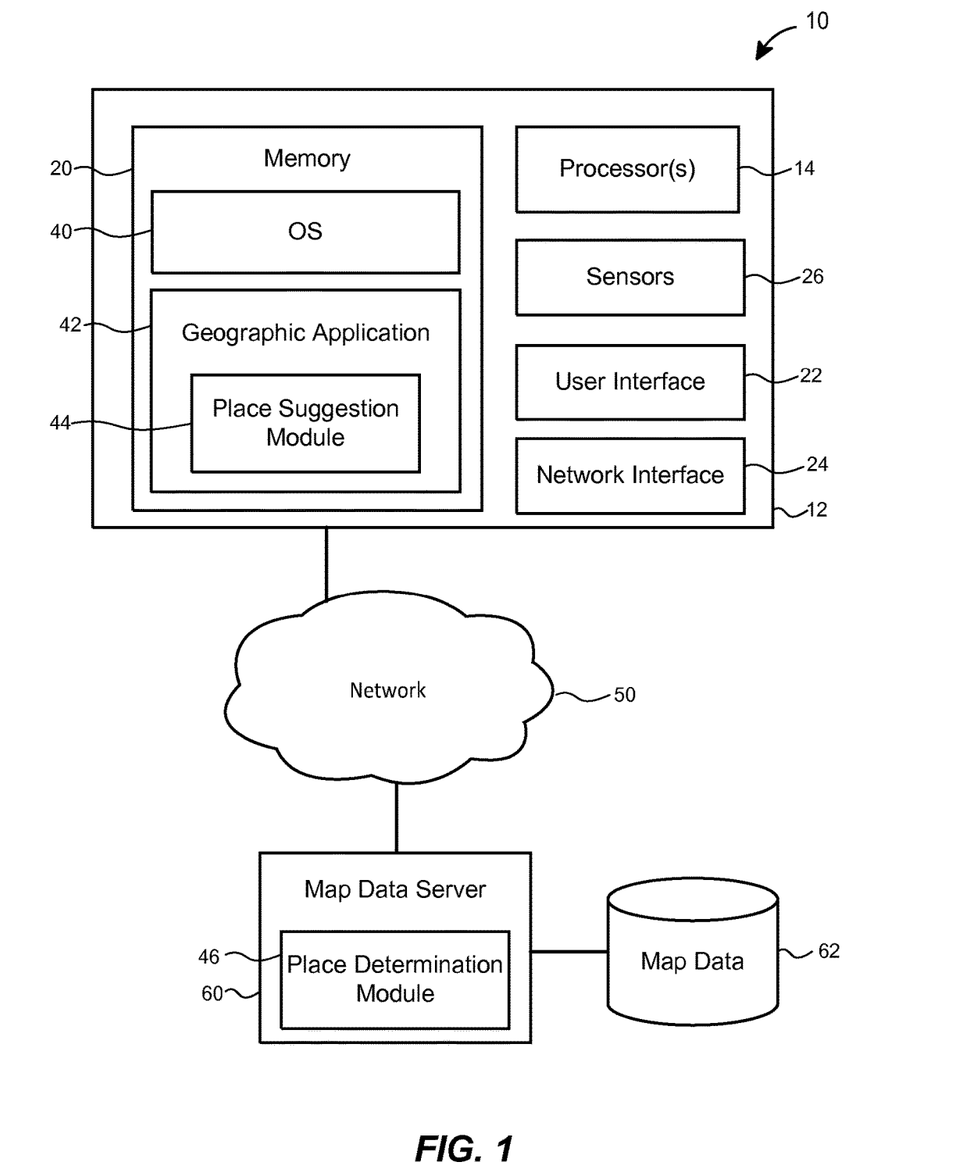
FIG. 1 is a block diagram of an example system in which the techniques of this disclosure for repositioning the viewport can be implemented.

An example system 10 in which these techniques can be implemented in illustrated in FIG. 1. The system includes a user device 12, which can be a portable device such as a smartphone or a tablet computer, a non-portable device such as a desktop computer, or a special-purpose computing device such as a navigator, for example. The user device 12 can include one or more processors 14, such as one or several central processing units (CPUs) and or several graphics processing units (GPUs), a computer-readable memory 20 which can include persistent (e.g., flash disk) and/or non-persistent (e.g., random access memory (RAM)) components, a user interface 22 which can include, for example, a touchscreen or a display device along with an input device, a network interface 24 for transmitting and receiving data via wired and/or wireless communication links, and one or more sensors 26 which can include a positioning unit such as a Global Positioning Service (GPS) module, an accelerometer, a gyroscope, etc.

The memory 20 can store instructions, executable on the one or more processors 14, that implement an operating system 40 and various software applications such as a geographic application 42. The geographic application 42 can be a special-purpose software application dedicated to generating geographic content such as interactive digital maps, navigation directions, results of geographic queries, etc., or, in another implementation, a general-purpose browser application executing a script and/or application programming interface (API) functions for generating geographic content. The geographic application 42 can operate on map data stored locally in the memory 20 or receive geographic content from an online geographic service. The geographic application 42 can include a place suggestion module 44 configured to detect continuous movement of the viewport, determine one or several suggested geographic places located in the general direction of the movement of the viewport, and provide control(s) for directly repositioning the viewport over one of the suggested geographic places, as discussed below.

With continued reference to FIG. 1, the communication network 50 can be the Internet or any other suitable network that includes wired and/or wireless communication links. The user device 12 in general can communicate with any number of servers to receive various geographic content such as map data, navigation directions, responses to geographic queries, etc. For simplicity, FIG. 1 illustrates only the map data server 60 coupled to a map database 62, which can store map data describing various natural geographic features (e.g., rivers, mountains, forests) as well as artificial geographic features (e.g., roads, buildings, parks), etc. The map data can include descriptions of map features in a vector graphics format as sets of interconnected vertices and/or bitmap images, for example. The map data server 60 can retrieve map data for generating a map image for a certain geographic region and provide the map data to the client device 12. The system 10 generally can include one or several map data servers 12 in any suitable configuration.

In operation, the place suggestion module 44 can detect that the user moved the viewport in a certain direction substantially continuously, over a certain period of time or by applying the same command a certain number of times. For example, the geographic application 42 can provide controls for panning a digital map, or repositioning the viewport without changing the zoom level, in the form of arrows overlaid on the map or displayed next to the map. If the user repeatedly (e.g., three times) operates the same control such as the "left" arrow, the place suggestion module 44 can automatically generate suggestions for repositioning the viewport. The control can be operated by mouse click, a keyboard command, a tap or double tap on a touchscreen, a voice command, or in any other suitable manner.

In some implementations, the place suggestion module 44 can be configured to generate suggestions if the user operates the same control at least N times in a row and within a certain time period, such as one second. In other implementations, the geographic application 42 can automatically re-apply the command if the user clicks or taps a control and does not unclick or lift her finger off the control, for example, during a certain period of time. As another example, the user interface 22 can include a touchscreen, and the geographic application 42 can be configured to reposition the viewport in response to gestures such as "swipes" or "flicks." As yet another example, the user can provide audio commands for repositioning the viewport, such as "pan left."

In each of these implementations, the place suggestion module 44 can detect continuous movement of the viewport in response to the geographic application 42 executing a sequence of explicit or implicit user commands, and provide one or several suggested locations for repositioning the viewport.

To determine one or several geographic places, the place suggestion module 44 can utilize map data stored in the memory 20, according to one implementation. In another implementation, the place suggestion module 44 receives indications of suggested geographic places via a communication network 50 from a place suggestion determination 46 operating in a network server 60. Example operation of the place suggestion module 44 and/or the place determination module 46 is discussed in more detail below.

Figure 2:
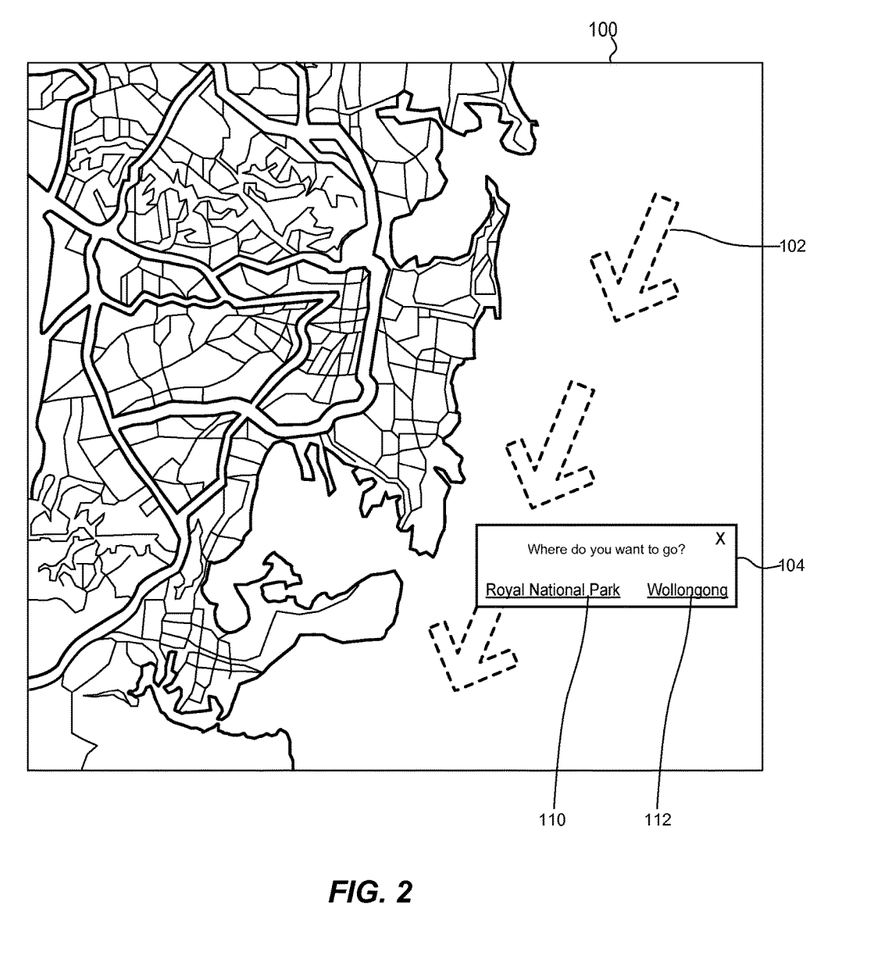
FIG. 2 schematically illustrates example generation of an interactive control for repositioning the viewport in response to continuous viewport movement.
Figure 3:
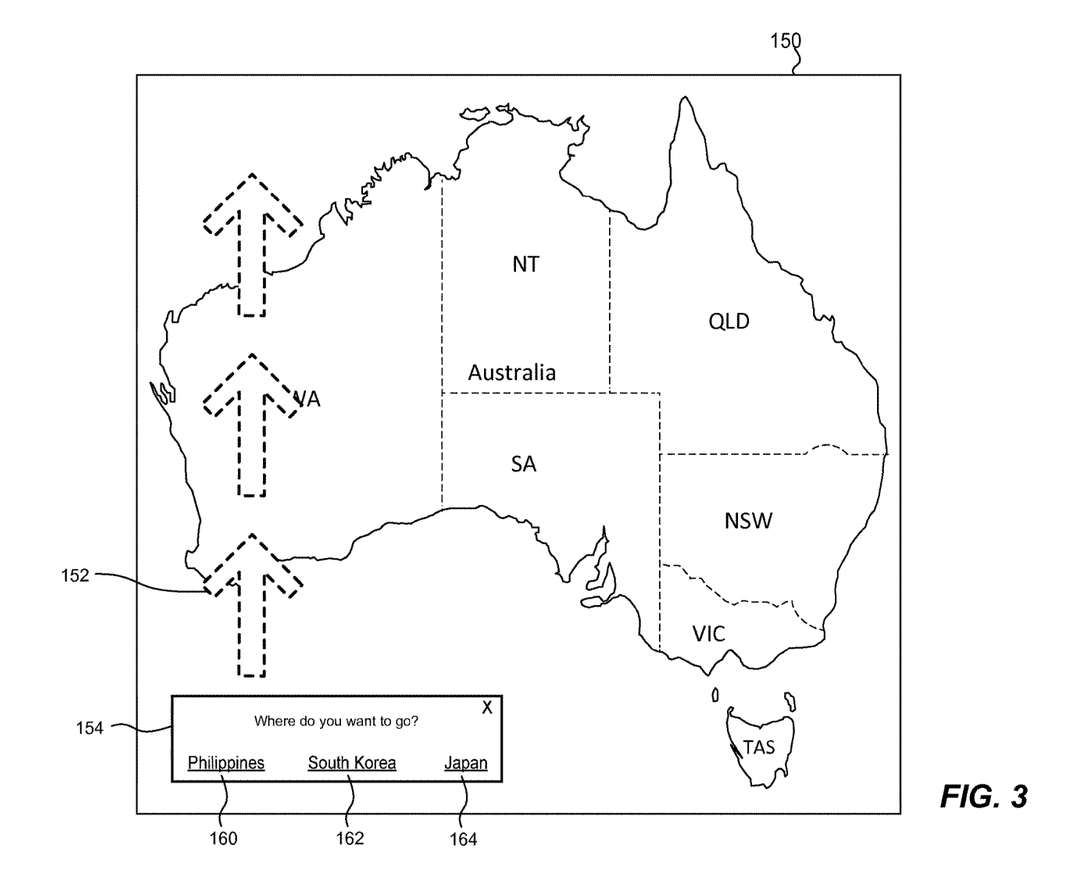
FIG. 3 schematically illustrates another example generation of an interactive control for repositioning the viewport in response to continuous viewport movement.

Selecting Geographic Places and Providing
Controls for Repositioning the Viewport Example operation of place suggestion module 44 and/or the place determination module 46 is discussed next with reference to FIGS. 2 and 3. Each of FIGS. 2 and 3 illustrates an example digital map that can be displayed within a viewport on the computing device 12 in a respective scenario, along with a window including suggested geographic places for directly repositioning the viewport and a schematic depiction of continuous movement of the viewport. For convenience, the determination of the trajectory of a viewport, selection of candidate geographic places, and selection of suggestions from among the candidate geographic places are discussed primarily with reference to the place suggestion module 44 operating in the user device 12. It will be understood, however, that at least some of these techniques can be implemented in the map data server 60 or another suitable network device or group of network devices.

Referring first to FIG. 2, the geographic application 42 can display a digital map of a part of Sydney, Australia in a viewport 100. More particularly, the viewport 100 corresponds to a certain zoom level, or level of magnification at which geographic features are depicted. The geographic area that is currently viewable within the viewport 100 lies on the trajectory defined by the continuous movement of the viewport 100, schematically illustrated in FIG. 2 by arrows 102. For example, the user may have swiped the viewport 100 in the direction of the arrows 102 three times in quick succession, and the place suggestion module 44 can detect substantially continuous movement of the viewport 100.

The place suggestion module 44 in this example scenario determines which geographic places are on the trajectory of the arrows 102 in view of the zoom level of the viewport 100. For example, the place suggestion module 44 can consider geographic places which will be visible at some point if the user continues to pan the viewport 100 in the direction of the arrows 102 a certain number of times M (e.g., 10, 15, 20), each instance of panning advancing the viewport by a certain fixed amount. As a more specific example, the fixed amount in this example can correspond to the width of the geographic area covered by the viewport 100, which is approximately six miles, and the value of M can be ten. In other words, the place suggestion module 44 can consider candidate geographic places that will be visible at some point if the user pans the viewport ten more times, advancing the viewport by approximately 60 miles.

In another implementation, the value of M can be selected in view of the number of detected successively applied pan commands, N. For example, if the place suggestion module 44 detected three successive pan commands (N=3), the value of 10 can be assigned to M, but if the place suggestion module 44 detects an additional successive pan commands (N=4), a higher value, such as 15, can be assigned to M. In yet another implementation, the maximum distance within which candidate geographic places should be considered can be determined as a function of the zoom level: 10 miles for zoom level $Z_N$, 20 miles for zoom level $Z_{N-1}$, 40 miles for zoom level $Z_{N-2}$, etc. More generally, the place suggestion module 44 can select a certain maximum distance for repositioning the viewport in view of the current zoom level of the viewport 100.

In this example, the place suggestion module 44 considers geographic places within approximately 60 miles of Sydney, in the direction of the arrows 102. Because numerous geographic places matching these two criteria can be found, the place suggestion module 44 can select, from among multiple candidate geographic places, those locations that are more likely to be of interest to the user.

To this end, the place suggestion module 44 can consider any combination of one or several factors such as, for example, the population of a city or town, the size of the area covered by the city or town, how frequently users request navigation directions to the place, rating or reviews available for the place, other indications of popularity of the place, similarity of the place to what is currently being displayed within the viewport, etc. For example, if the user is currently viewing the map a city in the viewport, the place suggestion module 44 may prioritize cities when selecting geographic places from among the candidate geographic places, and if the user is currently viewing the map of a national park, the place suggestion module 44 may prioritize parks when selecting geographic places from among the candidate geographic places. Depending on the implementation, the place suggestion module 44 can compare candidate geographic places to the geographic place displayed within the viewport when the viewport originally started moving in the direction of the arrow 102, at the point when the place suggestion module 44 determines that the movement is substantially continuous, or at some intermediate point between these two points.

Further, the place suggestion module 44 in some scenarios can consider user-specific factors such as whether the user previously visited the visited the place or searched for the place, for example. The user in some embodiments operates certain controls and/or installs certain applications to allow the place suggestion module 44 to utilize the user's profile data in this manner. It is noted that only some of these factors may be applicable to certain geographic places.

In the example of FIG. 2, the place suggestion module 44 generates an overlay window 104 in which links to Royal National Park 110 and Wollongong 112, both located in the general direction indicated by the arrows 102 within the sixty-mile radius of Sydney, are displayed. The place suggestion module 44 can select Wollongong from among various geographic places located in the general direction indicated by the arrows 102 within the sixty-mile radius of Sydney, based at least in part on the relatively large size of this city, and Royal National Park because of its popularity.

When the user taps on, clicks, or other selects the link 110 or 112, the geographic application 42 can reposition the viewport 100 directly over Royal National Park or Wollongong, respectively. Thus, the place suggestion module 44 allows the user to directly "jump" to a geographic place rather than continue to pan the viewport 100.

Now referring FIG. 3, a viewport 150 includes a map of the entire Australian continent. The place suggestion module 44 in this scenario detects continuous movement of the viewport 150 when the user pans the viewport 150 in the direction of arrows 152. Because the viewport 150 in this example corresponds to a much lower level of magnification (i.e., lower zoom level) than the viewport 100 of FIG. 2, the place suggestion module 44 can consider candidate geographic locations within a longer distance. Accordingly, as illustrated in FIG. 3, the place suggestion module 44 can generate an overlay window 154 in which selectable links to Philippines (160), South Korea (162), and Japan (164) are provided. The place suggestion module 44 can select Philippines, South Korea, and Japan based on the sizes of these geographic entities, for example. Additionally or alternatively, the place suggestion module 44 can suggest entire countries as geographic places because the viewport 150 currently covers the entire Australian continent.

Example Method

Figure 4:
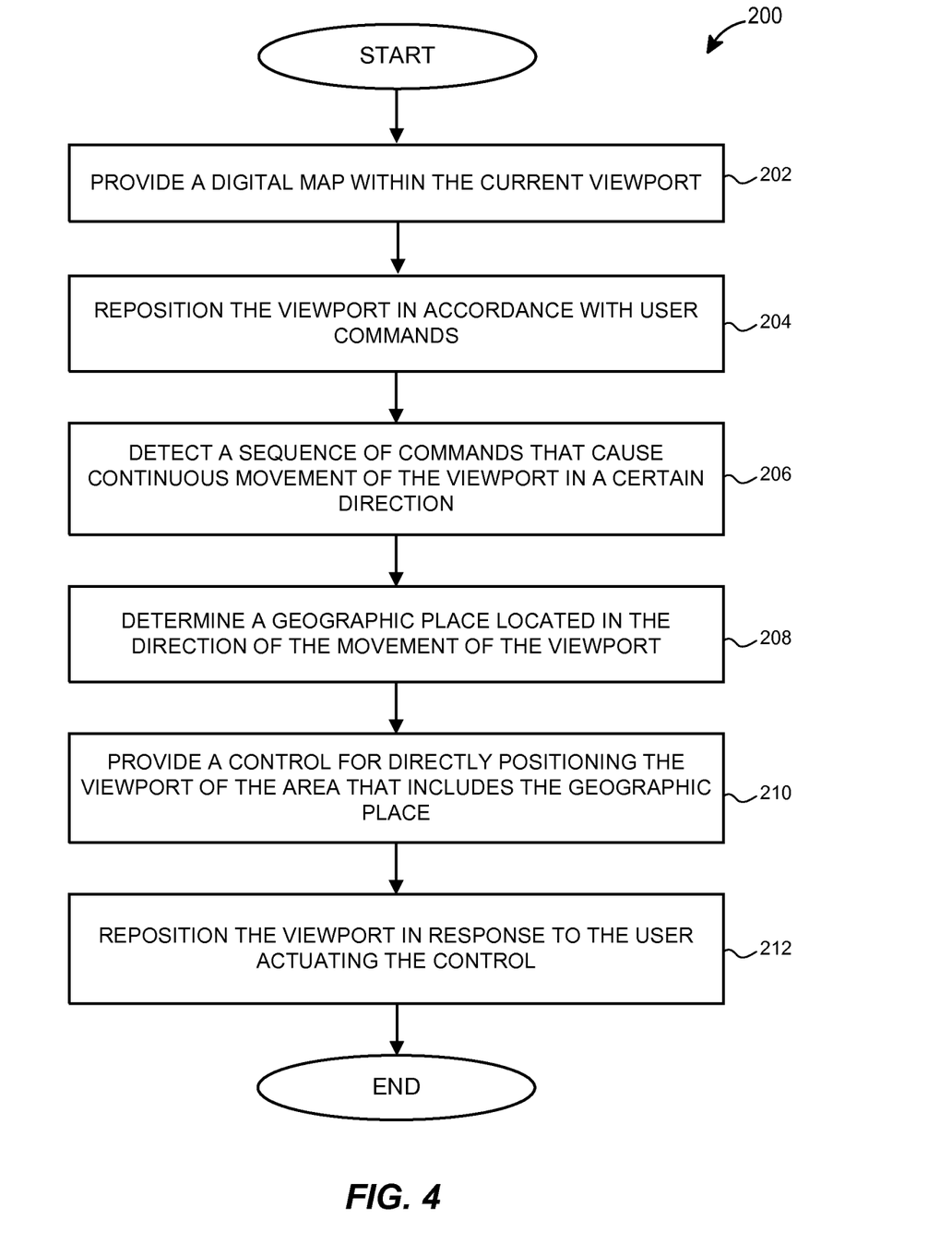
FIG. 4 is a flow diagram of an example method for generating an interactive control for repositioning the viewport based on continuous movement of the viewport.

Next, FIG. 4 illustrates a flow diagram of an example method 200 for generating an interactive control for repositioning a viewport based on continuous movement of the viewport. The method 200 can be implemented in the place suggestion module 44 and/or the place determination module 46, for example.

The method 200 begins at block 202, where a digital map of a geographic area is provided within a current viewport. At block 204, the viewport is repositioned in accordance with user commands. For example, the viewport can be panned on a touchscreen in response to a swipe gesture. The repositioning can occur multiple times in response to multiple user commands.

At block 206, a substantially continuous movement of the viewport is detected. More particularly, a sequence of similar user commands that cause such movement of the viewport can be detected. Referring back to the FIG. 2, for example, multiple pan commands that cause the viewport 100 to move in the direction of the arrows 102 are detected. In general, the sequence of similar user commands can be configured to include any suitable number such as three, four, seven, etc. Further, additional conditions may be enforced at block 206, such as the requirement that the direction of movement of the viewport which the user communicates with gesture not deviate from a straight line by more than five degrees after executing any of the viewport movement commands in the sequence.

Next, at block 208, at least one geographic place located in the direction of the movement of the viewport is selected. To this end, a trajectory of the viewport can be estimated, several candidate geographic places can be selected in view at least of the zoom level of the viewport (to limit the distance within which geographic places are considered), and one or several suggestions are selected from among the candidate geographic places. In the example illustrated in FIG. 2, for example, candidate geographic places can include smaller towns of Coledale, Woonona, Spring Hill, etc., can be considered, but Wollongong can be selected as a suggestion for repositioning the viewport because of the size of Wollongong. Depending on the scenario, one or several geographic places can be suggested.

At block 210, a control for quickly directly positioning the viewport over one of the suggested geographic places is provided. Referring again to FIGS. 2 and 3, the control can be provided in the form of a selectable link within an overlay window such as the window 104 or 154. At block 212, the viewport is directly positioned over the selected geographic place in response to the user operating the control. In one implementation, the viewport "jumps" to the new location without displaying map images for any intermediate geographic areas. In another implementation, the viewport appears to "fly over" the intermediate geographic area to provide an animation effect. Even in the latter implementation, however, the geographic application may omit some of the details, such as labels, minor features, point-of-interest icons, etc. for the areas over which the viewport flies over, thereby preserving processing power, memory, and bandwidth if the memory data arrives from a network server (such as the map data server 60).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

Upon reading this disclosure, those of ordinary skill in the art will appreciate still additional alternative structural and functional designs for providing suggestions for repositioning the map viewport through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing interactive user controls in a geographic application, the method comprising:
   providing, by one or more processors via a user interface, a digital map within a viewport to depict a first geographic area, wherein the viewport defines a viewable portion of the digital map;
   repositioning, by the one or more processors, the viewport relative to the digital map in accordance with user commands provided via the user interface to depict a second geographic area;
   detecting, by the one or more processors, a sequence of user commands that cause a substantially continuous movement of the viewport, during which a zoom level of the viewport stays the same;
   determining, by the one or more processors, a probable trajectory of the viewport consistent with the substantially continuous movement of the viewport, including determining a length of the probable trajectory in view of the zoom level;
   determining, by the one or more processors, a geographic place that will become visible within the viewport if the viewport continues to move along its current trajectory, the geographic place located in a third geographic area non-adjacent to the second geographic area; and
   providing, by the one or more processors via the user interface, a control for directly positioning the viewport over a portion of the digital map representing the geographic place to depict the third geographic area.

2. The method of claim 1, wherein detecting the sequence of user commands that cause the substantially continuous movement includes detecting, by the one or more processors, a plurality of consecutive swipe gestures applied to the user interface in a substantially same direction.

3. The method of claim 1, wherein detecting the sequence of user commands that cause the substantially continuous movement includes detecting, by the one or more processors, a plurality of consecutive mouse clicks applied to a direction control displayed on the user interface.

4. The method of claim 1, wherein determining the geographic place further includes:
   determining, by the one or more processors, a plurality of candidate geographic places on the trajectory, and
   selecting, by the one or more processors, the geographic place from the plurality of candidate geographic places based on at least one of (i) popularity of the geographic place, (ii) area associated with the geographic place measured, and (iii) population associated with the geographic place.

5. The method of claim 1, wherein providing the control for directly positioning the viewport over the portion of the digital map representing the geographic place includes:
   providing, by the one or more processors, an overlay window over the digital map, including providing a selectable link to a new location of the viewport within the overlay window.

6. The method of claim 5, further comprising:
   providing, within the overlay window, a plurality of selectable links corresponding to a plurality of respective geographic places.

7. The method of claim 1, further comprising:
   in response to the control being actuated, positioning the viewport over the portion of the digital map representing the geographic place, without displaying map images for any intermediate geographic areas between the second geographic area and the third geographic area.

8. A computing device comprising:
   a user interface configured to display content and receive user input;
   one or more processors coupled to the user interface; and
   a non-transitory computer-readable medium storing thereon instructions that, when executed on the one or more processors, cause the computing device to:
   provide, via the user interface, a digital map within a viewport defining a viewable portion of the digital map to depict a first geographic area,
   reposition the viewport relative to the digital map in accordance with user commands provided via the user interface to depict a second geographic area,
   detect a sequence of user commands that cause a substantially continuous movement of the viewport, during which a zoom level of the viewport stays the same,
   determine a probable trajectory of the viewport consistent with the substantially continuous movement of the viewport, including determine a length of the probable trajectory in view of the zoom level;
   determine a geographic place that will become visible within the viewport if the viewport continues to move along its current trajectory, the geographic place located in a third geographic area non-adjacent to the second geographic area, and
   provide, via the user interface, a control for directly positioning the viewport over a portion of the digital map representing the geographic place to depict the third geographic area.

9. The computing device of claim 8, wherein to detect the sequence of commands that cause the substantially continuous movement, the instructions cause the computing device to detect a plurality of consecutive swipe gestures applied to the user interface in a substantially same direction.

10. The computing device of claim 8, wherein to detect the sequence of commands that cause the substantially continuous movement, the instructions cause the computing device to detect a plurality of consecutive mouse clicks applied to a direction control displayed on the user interface.

11. The computing device of claim 8, to determine the geographic place, the instructions further cause the computing device to:
 determine a plurality of candidate geographic places on the trajectory, and
 select the geographic place from the plurality of candidate geographic places based on at least one of (i) popularity of the geographic place, (ii) area associated with the geographic place measured, and (iii) population associated with the geographic place.

12. The computing device of claim 8, wherein to provide the control for directly positioning the viewport over the portion of the digital map representing the geographic place, the instructions further cause the computing device to:
 provide an overlay window over the digital map, including provide a selectable link to a new location of the viewport within the overlay window.

13. The computing device of claim 12, wherein the instructions further cause the computing device to:
 provide, within the overlay window, a plurality of selectable links corresponding to a plurality of respective geographic places.

14. The computing device of claim 8, wherein the instructions further cause the computing device to:
 in response to the control being actuated, position the viewport over the portion of the digital map representing the geographic place, without displaying map images for any intermediate geographic areas between the second geographic area and the third geographic area.

15. A method in a network server comprising:
 receiving, by one or more computing devices from a user device, indications of at least (i) a current position of a viewport defining a viewable portion of a digital map depicting to a first geographic area, (ii) a zoom level of the viewport, and (iii) a direction in which the viewport is travelling from the current position to depict a second geographic area;
 determining, by the one or more computing device, a probable trajectory of the viewport consistent with the direction in which the viewport is travelling at the same zoom level, including determining a length of the probable trajectory in view of the zoom level;
 determining, by the one or more computing devices, a plurality of candidate geographic places that will become visible within the viewport if the viewport continues to move along its current trajectory, the candidate geographic places located in geographic areas non-adjacent to the second geographic area;
 selecting, by the one or more computing devices, a geographic place from the plurality of candidate geographic places based at least on the indicated zoom level; and
 sending, by the one or more computing devices, an indication of the geographic place to the user device for generating a control to directly position the viewport over a portion of the digital map representing the geographic place.

16. The method of claim 15, wherein selecting the geographic place from the plurality of candidate geographic places includes selecting the geographic place in view of respective sizes of the plurality of candidate geographic places.

17. The method of claim 15, wherein the selected geographic place is a first geographic place, the method further comprising:
 selecting, by the one or more computing devices, a second geographic place from the plurality of candidate geographic places, and
 sending, by the one or more computing devices, an indication of the second geographic place to the user device along with the indication of the first geographic place.

\* \* \* \* \*